Patented Feb. 19, 1952

2,586,681

UNITED STATES PATENT OFFICE 2,586,681

HERBICIDAL COMPOSITIONS CONTAINING STILL BOTTOMS FROM ALCOHOL SYNTHESIS BY THE "OXO" PROCESS

John F. McKay, Jr., Cranford, Howard L. Yowell, Westfield, and Leo Z. Jasion, Elizabeth, N. J., assignors to Standard Oil Development Company, a corporation of Delaware No Drawing. Application March 29, 1950,
Serial No. 152,746

16 Claims. (Cl. 71—2.3)

This invention relates to new and useful improvements in herbicidal compositions.

The use of aromatic petroleum oils themselves as contact weed killers is well-known in the art. These oils are not as phytotoxic as is sometimes desired, i. e., they do not result in permanent injury, and in many cases have to be fortified with additional toxic agents.

It has now been found that aromatic petroleum oils and particularly aromatic extracts of kerosene when fortified with particular liquid synthesis products derived from the reaction between olefins, carbon monoxide and hydrogen, the latter known as Oxo Bottoms, exhibit marked herbicidal activity. The toxicity of the combination of the two ingredients is far in excess of the mere arithmetic cumulative toxicity of each particular ingredient. This synergistic interaction also occurs when the composition contains a chemical fortifier such as sodium pentachlorophenate. It is thus possible to get comparable toxicity with the use of much less chemical fortifier. These synergistic results are surprising and are unpredictable from an examination of either of the two component liquids.

The aromatic petroleum oils employed are the well known cracked and uncracked oils conventionally utilized for herbicidal purposes (see e. g., California Agricultural Extension Service Publication, Circular 137, July 1947, pp. 12–16). It is desired that these oils have a minimum aromatic content of 35 weight per cent, and a boiling point in the range of 325°–600° F.

The aromatic extracts of kerosene particularly utilized in the compositions of this invention are prepared by well known processes of extracting aromatics from kerosene, e. g. extracting kerosene with liquid sulfur dioxide and evaporating the sulfur dioxide from the extract phase or extracting the aromatics with phenol and stripping the phenol from the extract phase. The aromatic extracts of kerosene employed boil predominantly in the range of 325°–600° F., and have an aromatic content of between 83% and 98 weight per cent.

Typical inspections are as follows, where A is an aromatic extract of kerosene and B is a catalytically cracked petroleum cycle stock:

|  | A | B |
|---|---|---|
| Specific Gravity | 0.89 | .87 |
| A. S. T. M. Dist., °F.: |  |  |
|   I. B. P | 325 | 406 |
|   F. B. P | 580 | 580 |
| Mixed Aniline Point, °F | 81 | 135 |
| Flash Point, °F | 140 | 190 |
| Per Cent Aromatics | 85 | 35 |

The Oxo Bottoms product is produced by what is now the well known two-stage process for producing Oxo alcohols. In the first stage an olefinic material, a carbonylation catalyst, and CO and $H_2$ are reacted to give a product which consists predominantly of aldehydes. This material is catalytically hydrogenated in the second stage to give the corresponding alcohols. The over-all reaction may be formulated as follows:

Stage 1. $R-CH=CH_2 + CO + H_2 \rightarrow RCH_2-CH_2CHO$

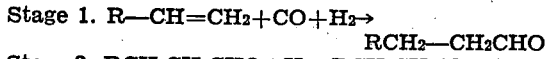
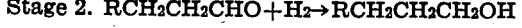

Stage 2. $RCH_2CH_2CHO + H_2 \rightarrow RCH_2CH_2CH_2OH$

Both the aldehyde and the alcohol formed as a result of the reaction contain one more carbon atom than the olefinic material from which they are derived.

Alcohols from the second stage of the reaction are used as intermediates for the preparation of plasticizers and detergents. Alcohols prepared by the Oxo reaction and having from eight to sixteen carbon atoms find maximum usefulness for these purposes.

The carbonylation, or Oxo stage, as it is sometimes called, is widely useful and is used effectively with both long and short chain olefinic compounds, depending on the type alcohol desired. Thus, straight and branch chained olefins and diolefins such as propylene, butylene, butadiene, pentene, pentadiene, hexene, heptene, olefin polymers such as di- and tri-isobutylene, the hexene and heptene dimers, polypropylenes, and olefinic fractions from the hydrocarbon synthesis process or from thermal or catalytic cracking operations, and other sources of hydrocarbon fractions containing such olefins may be used as starting materials, depending on the nature of the final product desired. In general, olefins having up to about 18–20 carbon atoms in the molecule are preferred in this reaction. Olefins of $C_7$ to $C_{15}$ ranges are, of course, required to prepare the commercially preferred $C_8$ to $C_{16}$ alcohols.

The catalysts for the first stage of the process are usually employed in the form of the catalytically active metal salts of high molecular weight fatty acids such as stearic, palmitic, oleic, naphthenic and similar acids. Thus, examples of suitable catalysts are such organic salts as cobalt stearate, oleate, or naphthenate or iron linoleate. These salts are soluble in the liquid olefin feed and may be supplied to the first reaction zone as hydrocarbon solutions, preferably dissolved in the olefin feed.

The synthesis gas mixture fed to the first stage may consist of any ratio of $H_2$ to CO, but preferably these two gases are present at about one volume hydrogen per volume of CO. The conditions for the reaction of olefins with $H_2$ and CO vary somewhat in accordance with the nature of the olefin feed, but the reaction is generally conducted at pressures in the range of about 1500 to 4500 p. s. i. g., and at temperatures in the range of about 150° to 450° F.

The hydrogenation stage may be operated at conventional hydrogenation conditions which include temperatures, pressures, gas and liquid feed rates approximately within the ranges specified above for the first stage. Various known types of hydrogenation catalysts such as nickel, tungsten, molybdenum, their oxides and sulfides and others may be used. These include catalysts of both the sulfur sensitive and sulfur insensitive types. The catalyst may be supported on some suitable carrier such as charcoal. The liquid product from the hydrogenation stage is worked up by distillation to separate the desired alcohols from unconverted olefinic feed material, unhydrogenated carbonyl compounds, and saturated hydrocarbons formed in the process.

In the hydrogenation stage, in the presence of the hydrogenation catalysts and under the conditions employed, further condensations and reactions of the initially formed aldehydes and alcohols take place to give additional high boiling impurities which are generally allowed to remain as the "bottoms" after the distillation of the main portion of the alcohol is completed.

In a process for the manufacture of iso-octyl alcohol by a two-stage Oxo process using a predominantly $C_7$ olefinic feed, the final distillation of the crude $C_8$ alcohol product results in a bottom fraction representing about 15–30% of the crude alcohol charge to the distillation zone. This bottoms fraction consists of $C_8$ and some $C_9$ alcohols, as well as $C_{15}$–$C_{16}$ alcohols, $C_{24}$ acetals and $C_{16}$ ethers. Of these constituents, the $C_8$ alcohols represent the final traces (1–5%) remaining in the bottoms from the distillation of the main product. The remaining so-called bottoms consists primarily of higher boiling oxygenated compounds formed by side reactions as outlined above occurring in either the first or second stage of the $C_8$ alcohol process. As clearly as can be determined by chemical analysis and infra-red absorption spectographic study, these constituents were identified as $C_{15}$ secondary alcohols, $C_{15}$ aldehydes or ketones, $C_{24}$ acetals, $C_{22}$ ester of $C_{14}$ naphthenic acids used in making the cobalt catalyst for the first or oxonation stage, and saturated and unsaturated $C_{16}$ ethers. A typical chemical analysis of the higher boiling oxygenated compounds obtained in a plant, and free from $C_8$–$C_9$ alcohols fraction, is shown in Table I. The hydroxyl number, free and combined carbonyl numbers, and saponification and acid numbers are expressed in terms of milligrams of potassium hydroxide per gram of sample analyzed.

TABLE I

TYPICAL COMPOSITION OF THE OXO ALCOHOL BOTTOMS

| Analysis | Constituents, percent by wt. |
|---|---|
| Hydroxyl No., 95<br>Free Carbonyl No., 0.5<br>Combined Carbonyl No., 29<br>Saponification No., 21<br>Gravity °API, 33.3<br>Acid No. 0.2 | 48.6% $C_{15}$–$C_{16}$ alcohol<br>0.2% $C_{15}$–$C_{16}$ aldehyde or ketone<br>19.1% $C_{24}$ acetal<br>14.7% $C_{22}$ (octyl naphthenate ester)<br>17.4% Saturated $C_{16}$ ether (dioctyl ether)[1] |

[1] Calculated by difference.

Analytical results obtained by chemical and infra-red methods appear to be in essentially good agreement as indicated by their comparison in Table II below:

TABLE II

COMPARISON OF ANALYSES OF OXO ALCOHOL BOTTOMS

| | Chemical Method | Infra-red Method |
|---|---|---|
| Percent $C_{15}$–$C_{16}$ alcohols | 48.6 | 43 |
| Percent $C_{15}$–$C_{16}$ ketones | 0.2 | 4 |
| Percent $C_{22}$ ester | 14.7 | 13 |
| Percent acetal | 19.1 | 9 |
| Percent acid | Trace | |
| Percent saturated $C_{16}$ ether | 17.4 | 27 |
| Percent unsaturated $C_{16}$ ether | | 3 |

Thus it can readily be seen that the synthetic Oxo processes give complex mixtures of compounds having various carbon structures in the molecules and having varied molecular weights. (As to the complex nature of these products see United States Bureau of Mines Publication, R. I. 4270 "Critical Review of Chemistry of Oxo Synthesis, etc.," June 1948.)

The bottoms product from the $C_7$ olefin feed substantially free of $C_8$ alcohols, boils in the range of about 190° C. to about 18 weight per cent, boiling above 395° C. The presence of $C_8$ and $C_9$ alcohols do not affect the herbicidal activity but result in a lowering of boiling point as compared to the alcohol free product.

It is to be understood that whenever the term "Oxo Bottoms" is used in the specification, it indicates a still bottoms product produced by the indicated two-stage operation. As mentioned above, this Oxo Bottoms product by itself possesses only slight herbicidal activity.

The aromatic petroleum oil and Oxo Bottoms 2-component system solutions can be employed as such when oil sprays are desired for herbicidal purposes. Less total spray is used in an oil spray system than in an aqueous emulsion system. The aromatic petroleum oil is preferably present in an amount of from 75 to 99 volume percent, and the Oxo Bottoms is preferably present in an amount of from 1 to 25 volume percent.

For many purposes, especially where water supplies are readily available at the sight of spraying operation, it is desirable to employ the herbicidal oil compositions of this invention in the form of aqueous emulsion sprays. The oil compositions are made up in the form of emulsion concentrate compositions for the purpose. These emulsion concentrate compositions are subsequently diluted with water at the spraying location. The aromatic oil and Oxo Bottoms are employed in approximately the same proportions as before indicated for the solutions, but in addition, up to about 5 weight percent of an oil-soluble and preferably also, water-soluble emulsifying agent is added, so as to be able to secure aqueous emulsions and consequent uniformity of dispersion in the resulting colloidal system. The use of these emulsifying agents also increases the spreading action of the spray by decreasing the surface tension of the liquid carrier. This results in the securing of better contact of the spray with the surface being treated, and consequently brings the active ingredient into intimate contact with the weeds.

Among the oil-soluble, and preferably water-soluble emulsifying agents that can be used are the sulfates of long-chain alcohols such as dodecanol up to octadecanol, sulfonated amide and ester derivatives, sulfonated aromatic and mixed alkylaryl sulfonate derivatives, esters of fatty acids such as the ricinoleic acid ester of sorbitol, and petroleum sulfonates of $C_{10}$–$C_{20}$ length. The non-ionic emulsifying agents such as the ethylene oxide condensation products of alkylated phenols may be used.

The emulsion concentrate compositions can be diluted with as much as 99 parts of water and the resulting compositions still exhibit herbicidal potency.

Additional toxic ingredients such as sodium pentachlorophenate, 2,4-dichloro phenoxy acetic acid and its derivatives, pentachlorophenol, dinitrophenolics, N - isopropylphenylcarbamate, 2,4,5-trichloroacetic acid, sodium trichloroacetate, arsenites, etc., may be added to either the solution compositions and the emulsion concentrate compositions or both, depending upon solubility characteristics and the weeds it is sought to destroy. These additional fortifiers may be added in an amount up to the saturation point in the oils or in excess if water-soluble. Thus, for example, pentachlorophenol is soluble in compositions of aromatic extract of kerosene and Ox Bottoms in an amount up to about 35 weight percent.

The following examples illustrate this invention and indicate test results obtained on the compositions of this invention.

5% emulsifier was added to the aromatic extract of kerosene, to a cracked petroleum oil containing 35 weight per cent aromatics, and to the Oxo Bottoms derived from a $C_7$ olefin stream separately and 2% aqueous emulsions of each product were applied to Coleus plants. The aromatic extract of kerosene was also applied to a Coleus plant as a 10% aqueous emulsion. The aromatic extract of kerosene and Oxo Bottoms were mixed in an 80–20 volume ratio, 5% emulsifier added, and the composition applied to a Coleus plant as a 2% aqueous emulsion. The petroleum oil containing 35 weight per cent aromatics and Oxo Bottoms were also mixed in an 80–20 volume ratio, 5% emulsifier added, and the composition applied to a Coleus plant as a 2% aqueous emulsion. Results of these experiments are given in Table III.

Example II

The Oxo Bottoms used in this test was similar on nature to the Oxo Bottoms employed in the preceding example.

A 5.3% by weight solution of sodium pentachlorophenate was made up in an aromatic extract of kerosene using 5 weight per cent methyl ethyl ketone as a solubilizing agent, and 2.1% by weight emulsifier added (Material 7 below).

A 15% by weight solution of sodium pentachlorophenate was made up in Oxo Bottoms and 5% emulsifier added (Material 8 below). A mixture of the latter composition in an aromatic extract of kerosene was then made up such that the sodium pentachlorophenate additive was present at 4.5% concentration (70% of the aromatic extract of kerosene and 30% of the 15% solution of sodium pentachlorophenate in Oxo Bottoms containing emulsifier). (Material 9.)

A 30 weight per cent solution of pentachlorophenol was made in Oxo Bottoms, 5 weight per cent emulsifier added, and a mixture of this composition was made up with an aromatic extract of kerosene such that the pentachlorophenyl additive was present at 3% concentration (90% of the aromatic extract of kerosene and 10% of the 30% solution of pentachlorophenol in Oxo Bottoms containing emulsifier). (Material 10 below.)

A mixture of the 15% by weight solution of sodium pentachlorophenate in Oxo Bottoms containing 5% emulsifier with a cracked aromatic petroleum oil containing 35% aromatics was made up such that the sodium pentachlorophenate addition was present at 3.0% concentration (80% of the aromatic petroleum oil and 20% of the 15% solution of sodium pentachlorophenate in Oxo Bottoms containing emulsifier). (Material 11 below.)

A 30 weight per cent solution of pentachlorophenol was made in Oxo Bottoms, 5 weight per cent emulsifier added, and a mixture of this composition was made up with a cracked aromatic petroleum oil containing 35 weight per cent aromatics such that the pentachlorophenol additive

TABLE III

| Material [1] | Concentration in Aqueous Emulsion | Coleus Response After— | | |
|---|---|---|---|---|
| | | 3 hr. | 1 day | 3 days |
| | Percent | | | |
| 1. Aromatic Extract of Kerosene | 2 | No injury | No injury | No injury. |
| 2. Oxo Bottoms | 2 | do | do | Slight injury. |
| 3. (80 parts aromatic extract of kerosene. 20 parts Oxo Bottoms). | 2 | Severe | Top of plant dead. Severe injury to rest of plant. | Severe injury. All leaves and top of stem dead. |
| 4. Aromatic Extract of Kerosene | 10 | No injury | Slight spotty injury. | Slight injury. Tips of leaves burnt. |
| 5. Cracked Aromatic Petroleum oil containing 35 weight percent aromatics. | 2 | do | No injury | No injury. |
| 6. Blend (80 parts aromatic petroleum oil containing 35 weight percent aromatics. 20 parts Oxo Bottoms). | 2 | do | Moderate injury. | Moderate injury. |

[1] All compositions contain 5% emulsifier based on organic components.

This example indicates the synergistic effect of Oxo Bottoms on the aromatic extract of kerosene and other petroleum oils. The Oxo Bottoms, aromatic extract of kerosene and cracked aromatic petroleum oil themselves possessed little if any activity at 2% concentrations. The combined compositions at the same 2% concentration exhibited, however, a very marked activity.

was present at 3% concentration (90% of the aromatic petroleum oil containing 35% aromatics and 10% of the 30% solution of pentachlorophenol in Oxo Bottoms containing emulsifier). (Material 12 below.)

These six compositions were then applied to Coleus plants as 2% aqueous emulsions. Results are given in Table IV.

TABLE IV

| Material [1] | Concentration in Aqueous Emulsion | Coleus Response After— | |
|---|---|---|---|
| | | 3 hr. | 1 day |
| | Per cent | | |
| 7. Aromatic Extract of kerosene + 5.3 weight percent sodium pentachlorophenate. | 2 | Slight | Moderate. |
| 8. Oxo Bottoms + 15 weight percent sodium pentachlorophenate. | 2 | ----do---- | Severe. |
| 9. Blend (70% aromatic extract of kerosene 30% Composition 8.)[2] | 2 | Severe | Dead. |
| 10. Blend (90% aromatic extract of kerosene. 10% Solution of 30% pentachlorophenol in Oxo Bottoms.)[3] | 2 | Dead | Do. |
| 11. Blend (80% aromatic petroleum oil containing 35% aromatics. 20% composition 8.)[4] | 2 | Severe | Do. |
| 12. Blend (90% aromatic petroleum oil. 10% solution of 30% pentachlorophenol in Oxo Bottoms.)[3] | 2 | Dead | Do. |

[1] All compositions contain Emulsifier.
[2] Effective concentration of solidum pentachlorophenate=4.5 weight percent.
[3] Effective concentration of pentachlorophenol=3 weight percent.
[4] Effective concentration of sodium pentachlorophenate=3 weight percent.

This example again indicates the synergistic combination of aromatic petroleum oils and aromatic extracts of kerosene with Oxo Bottoms, even in the presence of additional chemical fortifiers.

It should be emphasized that the Oxo Bottoms compositions are very complex in nature. Experimental work indicates that the synergistic activity of the Oxo Bottoms on the aromatic petroleum oils is due in large part to the combination of substances contained therein, rather than to any particular ingredient in the Oxo Bottoms.

The compositions of this invention may most advantageously be applied as sprays with conventional spraying equipment.

Diverse weeds such as the following are effectively treated by the compositions of this invention:

Knotweed (Polygonum aviculare)
Bluegrass, annual (Poa annua)
Crab grass (Digitaria sp.)
Yarrow (Achillea millefolium)
Onion, wild (Allium sp.)
Plantain, broad-leaf (Plantago major)
Speedwell or veronica (Veronica sp.)
Strawberry, false (Duchesnea indica)
Plantain, buckhorn or narrowleaf (Plantago lanceolata)
Nimble Will, or bush muhly (Muhlenbergia schreberi)
Chickweed, mouse-ear (Cerastium sp.)
Bugleweed (Ajuga reptans)
Heal-all (Prunella vulgaris)
Gill-over-the-ground or ground ivy (Nepeta hederacea)
Pennywort (Hydrocotyle rotundifolia)
Chickweed, common (Stellaria media)
Plantain, Rugel's (Plantago rugelii)
Sorrel, wood (Oxalis sp.)
Moneywort (Lysimachia Nummularia)
Vervain, prostrate (Verbena bracteosa)
Purslane, milk or spotted spurge (Euphorbia maculata)
Sorrel, red or sheep (Rumex acetosella)
Paspalum (Paspalum sp.)
Henbit (Lamium amplexicaule)
Goose grass (Eleusine indica)
Dandelion (Taraxacum officinale)
Buttercup (Ranunculus sp.)
Clover, white (Trifolium repens)
Medic, black or yellow trefoil (Medicago lupulina)

This invention has been described with respect to specific embodiments but is not to be limited thereby except as indicated in the appended claims.

What is claimed is:

1. A herbicidal composition comprising a solution in a major proportion of an aromatic petroleum oil of a minor proportion of a mixture of oxygenated organic compounds produced as a still bottoms product in a two-stage operation consisting of a first stage in which hydrogen, carbon monoxide and a $C_7$–$C_{15}$ olefin are contacted in the presence of a carbonylation catalyst forming a product predominantly aldehyde and of a second stage, in which the said aldehyde product is catalytically reduced with hydrogen to form the corresponding alcohol and thereafter removing the major portion of low-boiling alcohol components by distillation, leaving behind the still bottoms product, said petroleum oil boiling in the range of 325°–600° F., and having a minimum aromatic content of 35 weight percent.

2. A composition as in claim 1, in which the composition also contains dissolved sodium pentachlorophenate.

3. A composition as in claim 1, in which the still bottoms is present in an amount of from 1 to 25 volume percent, and the aromatic petroleum oil is present in an amount of from 75 to 99 volume percent.

4. A composition as in claim 3, in which the olefin used in stage 1 of the two-stage operation for producing the bottoms still product is a $C_7$ olefin, and the bottoms product consists predominantly of alcohols, acetals, esters, and ethers having from 15 to 24 carbon atoms.

5. A herbicidal oil emulsion concentrate composition comprising a major proportion of an aromatic petroleum oil boiling in the range of 325°–600° F., and having a minimum aromatic content of 35 weight percent; a minor proportion of a mixture of oxygenated organic compounds produced as a still bottoms product in a two-stage operation consisting of a first stage in which hydrogen, carbon monoxide and a $C_7$–$C_{15}$ olefin are contacted in the presence of a carbonylation catalyst forming a product predominantly aldehyde and of a second stage, in which the said aldehyde product is catalytically reduced with hydrogen to form the corresponding alcohol and thereafter removing the major portion of low-boiling alcohol components by distillation, leaving behind the still bottoms product; and a minor proportion of an oil soluble emulsifying agent.

6. A composition as in claim 5, in which the emulsion concentrate composition also contains dissolved pentachlorophenol.

7. A composition as in claim 5, in which the mixture of oxygenated organic compounds produced as a still bottoms product is present in an amount of from 1 to 25 volume percent based on the combined aromatic petroleum oil and the mixture of oxygenated organic compounds; the aromatic petroleum oil is present in an amount of from 75 to 99 volume percent based on the combined aromatic petroleum oil and the mixture of oxygenated organic compounds and the emulsifying agent is present in an amount up to about 5 weight percent based on the total composition.

8. A composition as in claim 7, in which the olefin employed in stage 1 of the two-stage operation for producing the bottoms still product is a $C_7$ olefin and the bottoms product consists predominantly of alcohols, acetals, esters, and ethers having from 15 to 24 carbon atoms.

9. A herbicidal composition comprising a solution in a major proportion of an aromatic extract of kerosene of a minor proportion of a mixture of oxygenated organic compounds produced as a still bottoms product in a two-stage operation consisting of a first stage in which hydrogen, carbon monoxide and a $C_7$–$C_{15}$ olefin are contacted in the presence of a carbonylation catalyst forming a product predominantly aldehyde and of a second stage, in which the said aldehyde product is catalytically reduced with hydrogen to form the corresponding alcohol and thereafter removing the major portion of low-boiling alcohol components by distillation, leaving behind the still bottoms product, said aromatic extract boiling in the range of 325°–600° F., and having an aromatic content of between 83% and 98 weight percent.

10. A composition as in claim 9, in which the composition also contains dissolved sodium pentachlorophenate.

11. A composition as in claim 9, in which the still bottoms is present in an amount of from 1 to 25 volume percent, and the aromatic extract of kerosene is present in an amount of from 75 to 99 volume percent.

12. A composition as in claim 11, in which the olefin used in stage 1 of the two-stage operation for producing the bottoms still product is a $C_7$ olefin, and the bottoms product consists predominantly of alcohols, acetals, esters, and ethers having from 15 to 24 carbon atoms.

13. A herbicidal oil emulsion concentrate composition comprising a major proportion of an aromatic extract of kerosene, said aromatic extract boiling in the range of 325°–600° F., and having an aromatic content of between 83 and 98 weight percent; a minor proportion of a mixture of oxygenated organic compounds produced as a still bottoms product in a two-stage operation consisting of a first stage in which hydrogen, carbon monoxide and a $C_7$–$C_{15}$ olefin are contacted in the presence of a carbonylation catalyst forming a product predominantly aldehyde and of a second stage, in which the said aldehyde product is catalytically reduced with hydrogen to form the corresponding alcohol and thereafter removing the major portion of low-boiling alcohol components by distillation, leaving behind the still bottoms product; and a minor proportion of an oil soluble emulsifying agent.

14. A composition as in claim 13, in which the emulsion concentrate composition also contains dissolved pentachlorophenol.

15. A composition as in claim 13, in which the mixture of oxygenated organic compounds produced as a still bottoms product is present in an amount of from 1 to 25 volume percent based on the combined aromatic petroleum oil and the mixture of oxygenated organic compounds; the aromatic extract of kerosene is present in an amount of from 75 to 99 volume percent based on the combined aromatic petroleum oil and the mixture of oxygenated organic compounds and the emulsifying agent is present in an amount up to about 5 weight percent based on the total composition.

16. A composition as in claim 15, in which the olefin employed in stage 1 of the two-stage operation for producing the bottoms still product is a $C_7$ olefin and the bottoms product consists predominantly of alcohols, acetals, esters, and ethers having from 15 to 24 carbon atoms.

JOHN F. McKAY, JR.
HOWARD L. YOWELL.
LEO Z. JASION.

No references cited.